US012663069B2

(12) United States Patent
Chapanar et al.

(10) Patent No.: US 12,663,069 B2
(45) Date of Patent: Jun. 23, 2026

(54) USE OF DYNAMIC PRESSURE TO CONTROL FLUID BLEED SYSTEM

(71) Applicant: Schaeffler Technologies AG & Co. KG, Herzogenaurach (DE)

(72) Inventors: Christopher Chapanar, Massillon, OH (US); Kyle Nelson, Delaware, OH (US); Antonio Eduardo Mogro Zambrano, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 7 days.

(21) Appl. No.: 18/775,637

(22) Filed: Jul. 17, 2024

(65) Prior Publication Data

US 2026/0022761 A1      Jan. 22, 2026

(51) Int. Cl.
    F16H 57/04          (2010.01)
(52) U.S. Cl.
    CPC ..... F16H 57/0423 (2013.01); F16H 57/0408 (2013.01); F16H 57/0417 (2013.01)
(58) Field of Classification Search
    CPC ............. F16H 57/0423; F16H 57/0408; F16H 57/0417
    See application file for complete search history.

(56) References Cited

U.S. PATENT DOCUMENTS

| | | | | |
|---|---|---|---|---|
| 4,736,819 | A * | 4/1988 | Muller ................ | F16H 57/0447 184/6.12 |
| 6,299,561 | B1 * | 10/2001 | Kramer ............... | F16H 57/0447 184/6.12 |
| 7,213,682 | B2 * | 5/2007 | Gibson ............... | F16H 57/0421 184/6.12 |
| 8,534,425 | B2 * | 9/2013 | Jabs .................... | F16H 57/0447 184/11.1 |
| 8,672,094 | B2 * | 3/2014 | Quehenberger .... | F16H 57/0457 184/6.12 |
| 11,015,616 | B2 * | 5/2021 | Hoffmann ............... | D06F 39/04 |
| 12,222,030 | B1 * | 2/2025 | Nelson ............... | F16H 57/0457 |
| 2004/0124722 | A1 * | 7/2004 | Uchida ................... | B60L 50/16 903/952 |
| 2023/0387755 | A1 * | 11/2023 | Nelson ..................... | H02K 9/19 |
| 2024/0030774 | A1 * | 1/2024 | Chapanar ............... | H02K 9/197 |
| 2024/0266903 | A1 * | 8/2024 | Kinion ..................... | H02K 5/15 |

(Continued)

FOREIGN PATENT DOCUMENTS

| | | | | |
|---|---|---|---|---|
| EP | | 3831630 A1 | 6/2021 | |
| WO | WO-2023153329 A1 * | | 8/2023 | ......... F16H 37/0813 |

*Primary Examiner* — Michael A Riegelman
(74) *Attorney, Agent, or Firm* — Volpe Koenig

(57) ABSTRACT

A drive unit for an electric vehicle including a gearbox having rotating components supported in a gearbox portion of the housing, an oil circuit in fluid communication with the gearbox portion of the housing for circulating oil in response to dynamic pressure generated by the rotating components of the gearbox when in operation, and a bleed passage connecting the oil circuit to the gearbox portion of the housing. Dynamic pressure in the gearbox portion of the housing generated by the rotating components when in operation restricts flow of oil through the bleed passage from the oil circuit to the gearbox portion of the housing, and static pressure in the gearbox portion of the housing when the gearbox is not in operation permits flow of oil from the oil circuit to the gearbox portion of the housing.

17 Claims, 10 Drawing Sheets

(56) References Cited

U.S. PATENT DOCUMENTS

| | | | |
|---|---|---|---|
| 2024/0372439 A1* | 11/2024 | Linton | ..................... H02K 1/32 |
| 2025/0062655 A1* | 2/2025 | Mogro Zambrano | . H02K 5/203 |
| 2025/0246967 A1* | 7/2025 | Mogro Zambrano | . H02K 5/203 |

* cited by examiner

USE OF DYNAMIC PRESSURE TO CONTROL FLUID BLEED SYSTEM

TECHNICAL FIELD

The present disclosure relates generally to an electric axle, and more specifically to a cooling circuit of an electric axle.

BACKGROUND

In general, electric axles are known structures used in electric and/or hybrid vehicles. In general, e-axles are intended for the smallest vehicle installation spaces. Heat dissipation out of e-axles is increasingly important because of the power density that e-axles achieve. For example, e-axles utilizing an asynchronous induction motor typically require active rotor cooling. As such, it is desirable to provide a way to accomplish the performance goals for cooling without adding significant costs, components, and complexity to the assembly.

SUMMARY

In accordance with one aspect a drive unit comprises a housing, a gearbox having rotating components supported in a gearbox portion of the housing, an oil circuit in fluid communication with the gearbox portion of the housing for circulating oil in response to dynamic pressure generated by the rotating components of the gearbox when in operation, and a bleed passage connecting the oil circuit to the gearbox portion of the housing. Dynamic pressure in the gearbox portion of the housing generated by the rotating components when in operation restricts flow of oil through the bleed passage from the oil circuit to the gearbox portion of the housing, and static pressure in the gearbox portion of the housing when the gearbox is not in operation permits flow of oil from the oil circuit to the gearbox portion of the housing.

The gearbox portion of the housing can include a sump. The oil circuit can be connected to the gearbox portion of the housing for supply and return of oil above the sump and the bleed passage can be connected to the sump. The housing can include a central portion containing at least one of a heat exchanger or a motor, and the oil circuit can be configured to circulate oil through at least one of the heat exchanger or the motor. The central portion of the housing can include a sump. The bleed passage can extend between the sump of the gearbox portion of the housing and the sump of the central portion of the housing. The drive unit can include at least one dynamic seal, and the bleed passage can be below the at least one dynamic seal such that when the gearbox is not in operation, a fluid level in the sump of the gearbox portion of the housing and a fluid level in the sump of the central portion of the housing can equalize at a level below the at least one dynamic seal. The drive unit can include a gasket between the gearbox portion of the housing and the central portion of the housing, wherein the bleed passage comprises a hole in the gasket. The housing can further include a drain port for draining oil from the sump of the gearbox portion of the housing.

In accordance with another aspect, a method of controlling flow of fluid in a hydraulic circuit of a drive unit comprises providing a drive unit having: a housing, a gearbox having rotating components supported in a gearbox portion of the housing, an oil circuit in fluid communication with the gearbox portion of the housing for circulating oil in response to dynamic pressure generated by the rotating components of the gearbox when in operation, and a bleed passage connecting the oil circuit to the gearbox portion of the housing, and operating the rotating components of the gearbox to generate a dynamic pressure in the gearbox portion of the housing to restrict flow of oil through the bleed passage from the oil circuit to the gearbox portion of the housing.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
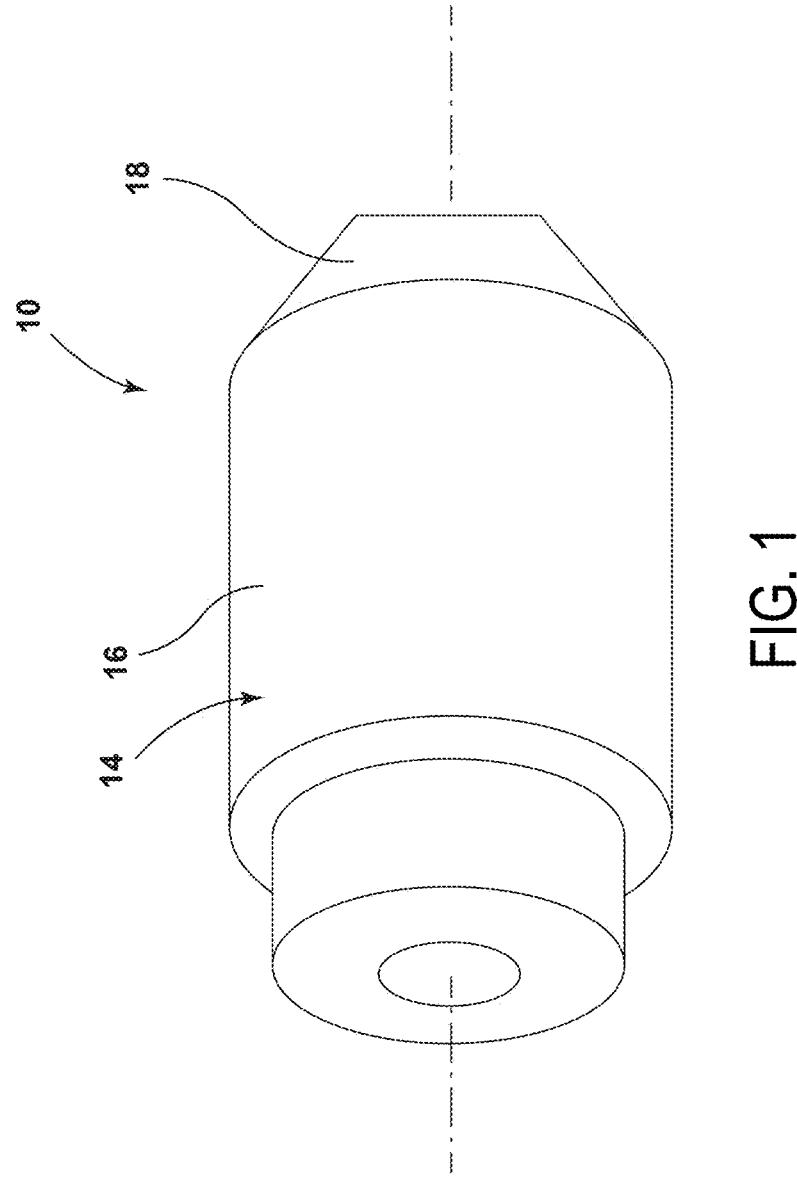
FIG. 1 is a top perspective view of an electric drive unit that includes a housing.
Figure 2:
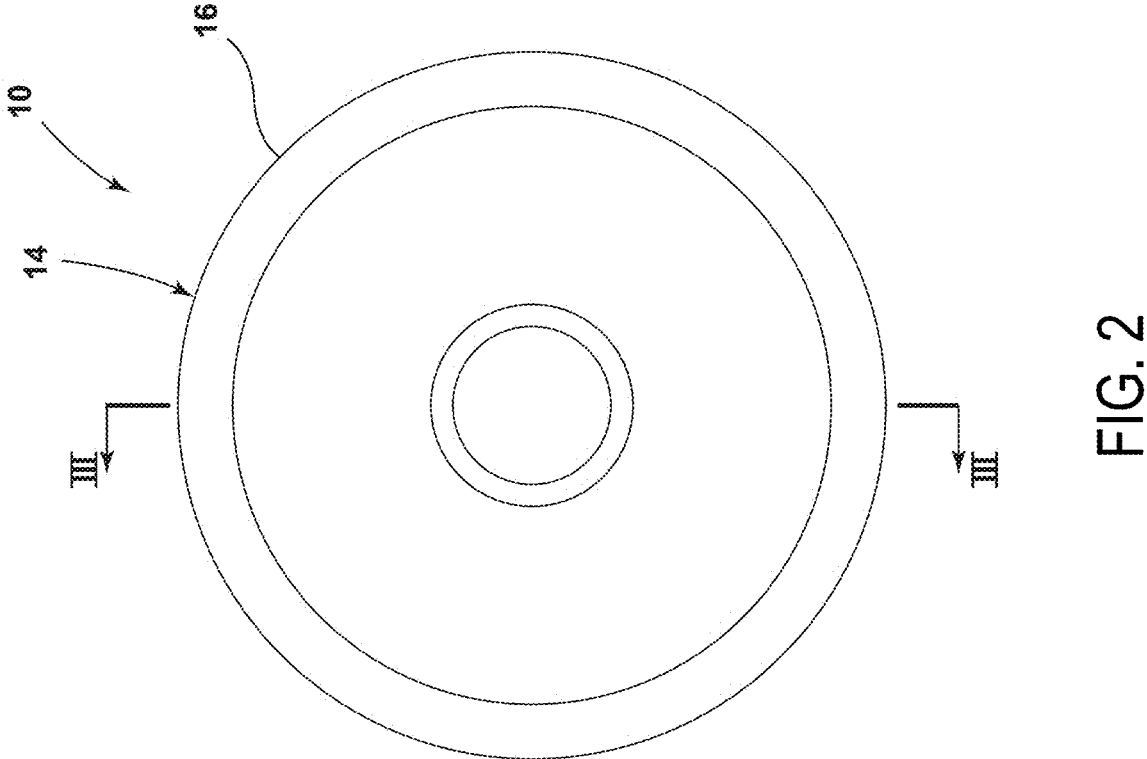
FIG. 2 is a side elevational view of the electric drive unit.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 3:
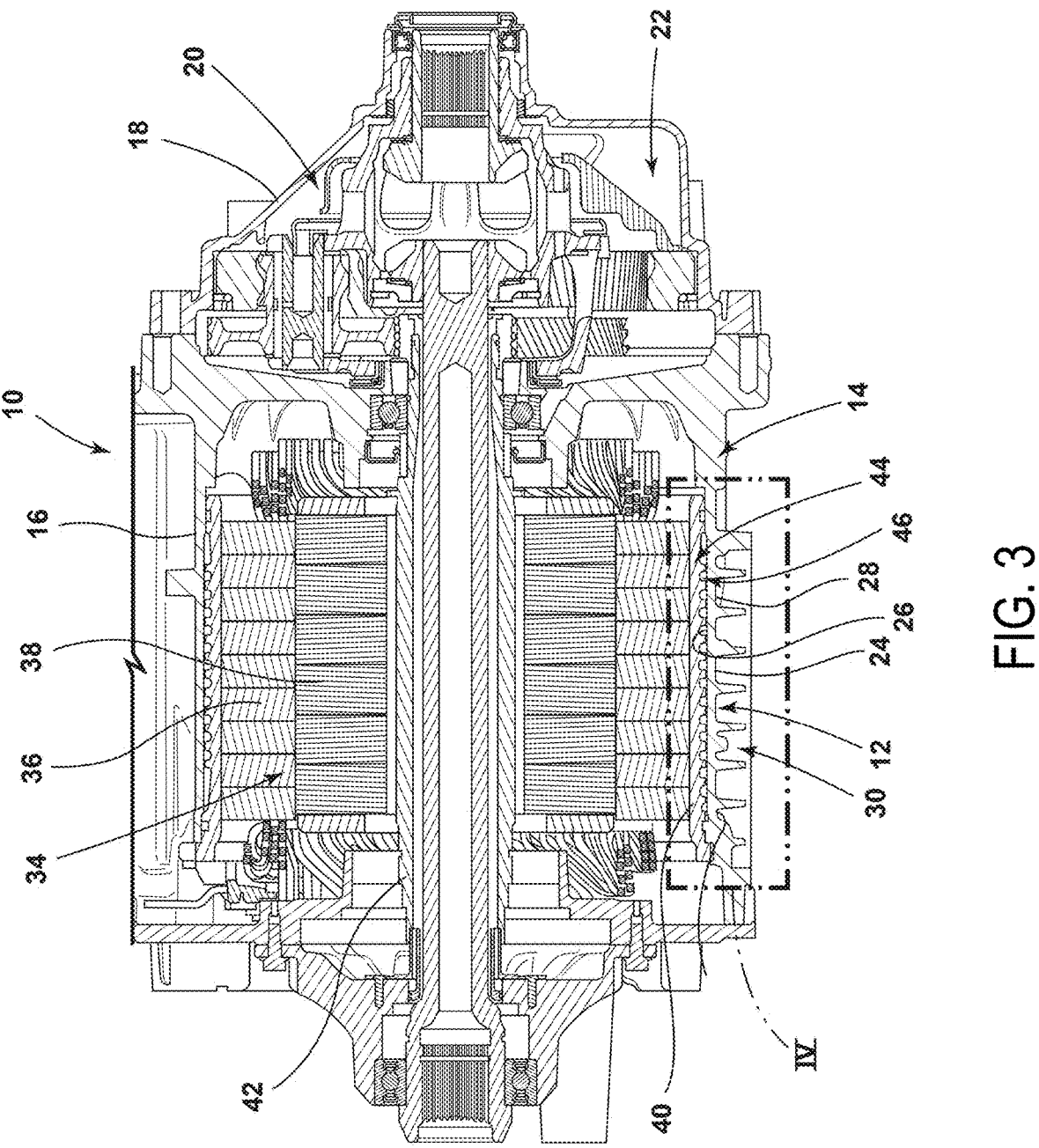
FIG. 3 is a cross-sectional view of the electric drive unit of FIG. 2 taken at line III-III illustrating a heat exchanger and a heat exchanging wall portion of the housing of the electric drive unit.

Referring to FIGS. 1-4, an electric drive unit 10 for a vehicle having a heat exchanger 12 is provided, wherein the electric drive unit 10 is designed as an electric axle ("e-axle"). The electric drive unit 10 has a housing 14. The housing 14 can be functionally divided into a motor or center housing region 16 and a gear or gearbox housing region 18. In some embodiments, the housing 14 may be designed as a die-cast aluminum housing and may be formed in multiple parts. A gearbox 20 may include a planetary gearset, a differential, and a sump 22, for example. A heat exchanger 12 can be integrated, or integral with, the housing 14. That is, the existing planned casting process for the housing 14 may be used to form at least a portion of the heat exchanger 12. In some embodiments, the heat exchanger 12 can be integrated, or integral with, the center housing region 16. The housing 14 can include a heat exchanging wall portion 24 that forms a portion of the heat exchanger 12, as described further herein. In some embodiments, the heat exchanger 12 may be located on the bottom of the electric drive unit 10, as illustrated in FIG. 3. In some embodiments, the heat exchanger 12 may be located in another location, for example, on the top of the electric drive unit 10.

Figure 4:
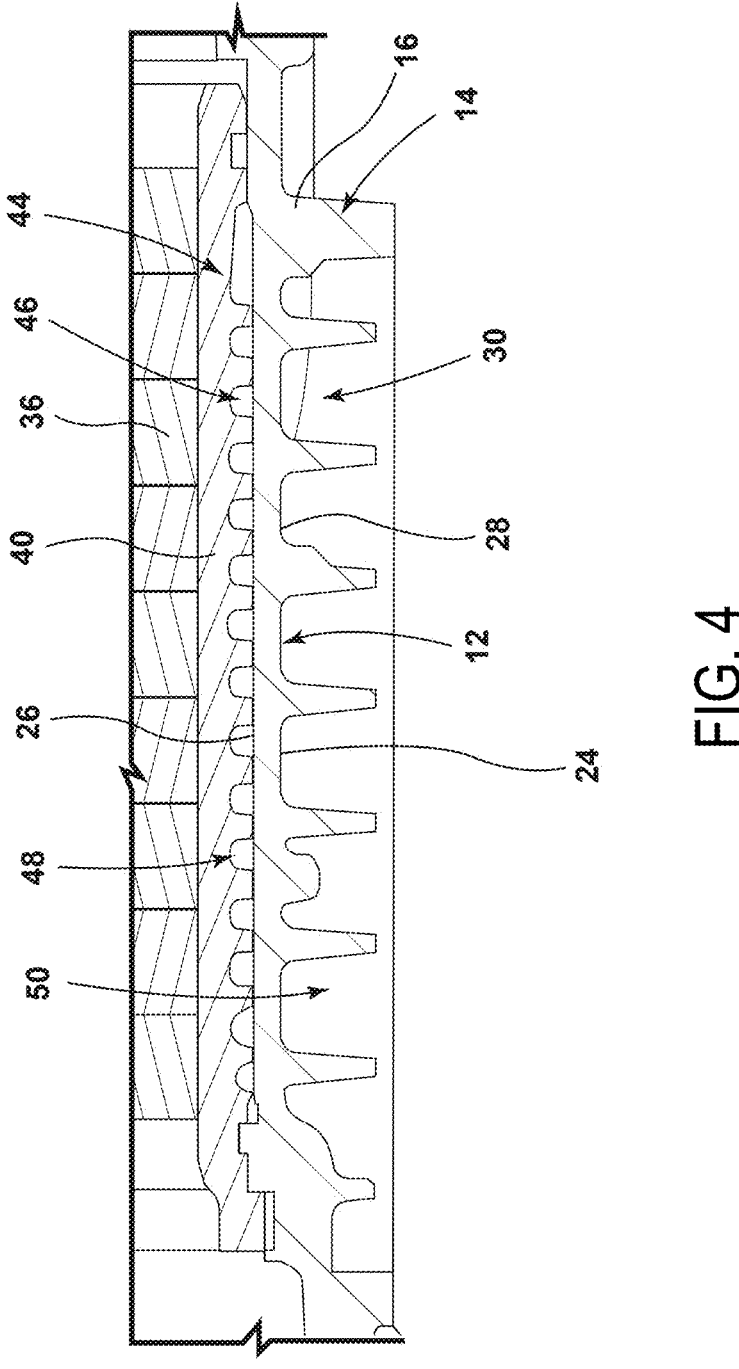
FIG. 4 is an enlarged view of the area IV of FIG. 3 illustrating the heat exchanger and the heat exchanging wall portion of the housing of the electric drive unit.
Figure 5:
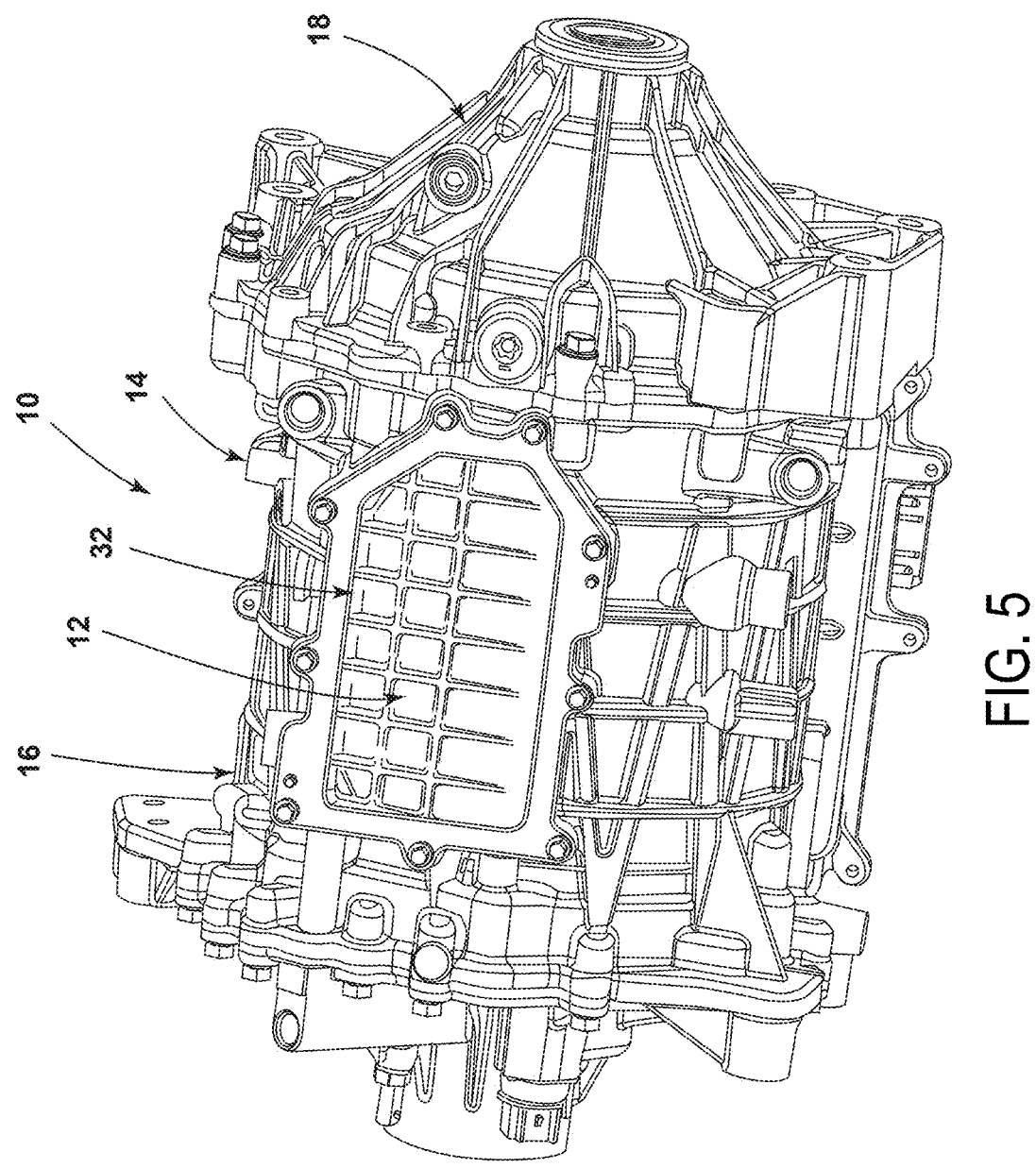
FIG. 5 is a perspective view of an electric drive unit that includes a cover coupled to a housing of the electric drive unit.
Figure 6:
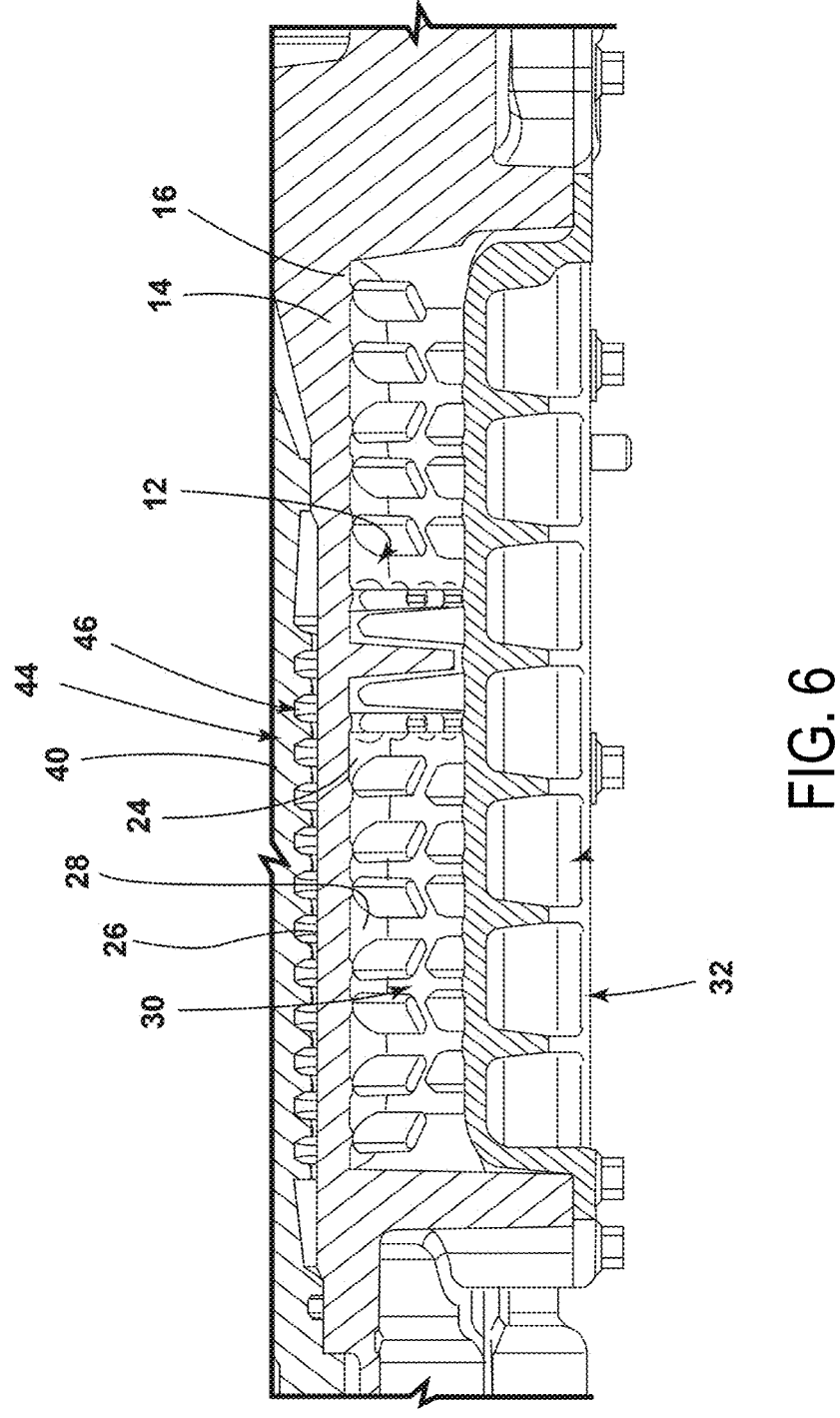
FIG. 6 is a cross-sectional view of a portion of the electric drive unit of FIG. 5 illustrating the cover and a heat exchanging wall portion of the housing that defines a fluid chamber.
Figure 7:
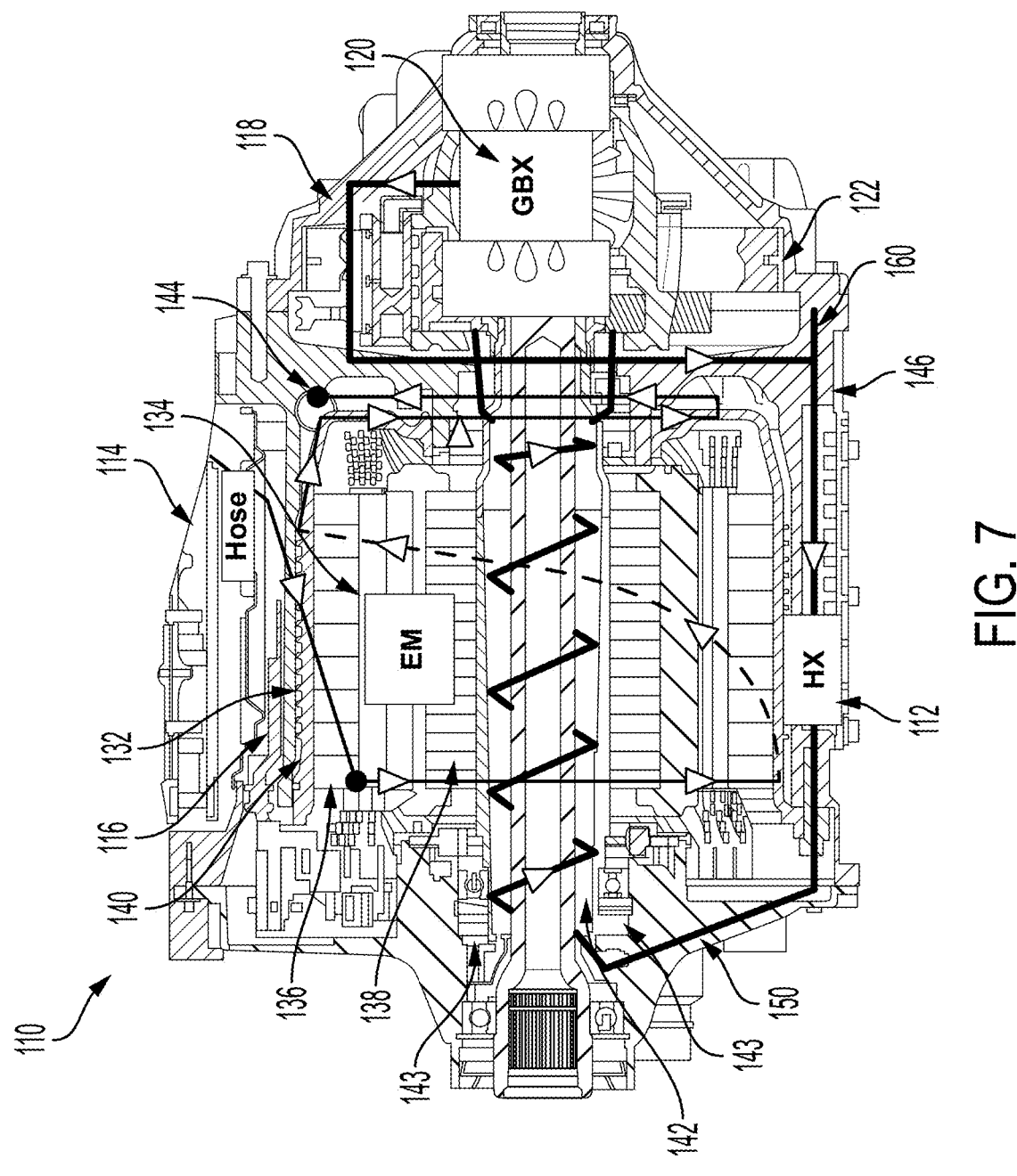
FIG. 7 is a cross-sectional view of a drive unit similar to FIG. 3 showing an oil circuit.

Referring now to FIGS. 1-6, the housing 14 includes an inner surface 26 and an outer surface 28 opposite the inner surface 26. As illustrated in FIG. 3, the outer surface 28 of the center housing region 16 of the housing 14 is radially outboard of the inner surface 26 of the center housing region 16. A fluid chamber 30 of the heat exchanger 12 may be defined by the outer surface 28 of a portion of the housing 14, such as the outer surface 28 of a portion of the center housing region 16 of the housing 14. As illustrated in FIGS. 3 and 4, the fluid chamber 30 is defined by the outer surface 28 of the heat exchanging wall portion 24 of the housing 14. In some embodiments, a cover 32 is mounted to the housing 14. For example, in the embodiment illustrated in FIGS. 5 and 6, the cover 32 is mounted to the outer surface 28 of the center housing region 16 of the housing 14 and is arranged radially outboard of the heat exchanging wall portion 24 of the housing 14. In the embodiment illustrated in FIG. 5, the cover 32 is mounted to the outer surface 28 of the center housing region 16 of the housing 14. The outer surface 28 of the heat exchanging wall portion 24 of the housing 14 and the cover 32 can cooperate to define the fluid chamber 30, as illustrated in FIG. 6. The fluid chamber 30 is configured to convey fluid in operation of the electric drive unit 10, as described further herein.

Referring still to FIGS. 1-6, the electric drive unit 10 includes an electric motor 34 having a stator 36, a rotor 38, a stator carrier 40, and a rotor shaft 42. The stator 36 is positioned radially outboard of the rotor 38. The housing 14 houses the electric motor 34, as illustrated in FIG. 3. A fluid jacket 44 is formed and bounded by the stator carrier 40 and a portion of the housing 14. In various embodiments, the fluid jacket 44 is formed and bounded by the stator carrier 40 and the inner surface 26 of the center housing region 16 of the housing 14. As illustrated in FIGS. 3 and 4, the inner surface 26 of the heat exchanging wall portion 24 of the housing 14 forms a portion of the fluid jacket 44. The fluid jacket 44 defines a fluid jacket cavity 46 that is configured to convey fluid, as described further herein. In the embodiment illustrated in FIG. 3, the inner surface 26 of a portion of the housing 14 including the inner surface 26 of the heat exchanging wall portion 24 of the housing 14 and the stator carrier 40 define the fluid jacket cavity 46.

The fluid jacket cavity 46 may be filled with a first fluid 48, such as a water-glycol mixture, for example, for cooling of the stator 36. A second fluid 50, such as oil, is disposed within the fluid chamber 30 of the heat exchanger 12 defined by the outer surface 28 of the heat exchanging wall portion 24 of the housing 14. Heat is transferred between the first and second fluids 48, 50 through the heat exchanging wall portion 24 of the housing 14. In operation of an exemplary embodiment of the electric drive unit 10, wherein the first fluid 48 comprises water (e.g., a water-glycol mixture) and the second fluid 50 is oil, the heat exchanger 12 functions via heat being transferred to the first fluid 48 from the second fluid 50 through the heat exchanging wall portion 24. In such embodiments, the fluid within the fluid chamber 30 is cooled. This arrangement may advantageously allow for heat exchange between the first and second fluids 48, 50 without added fluid pressure losses or the addition of additional fluid circuits. It is contemplated that a variety of different types of fluids can be utilized as the first fluid 48 within the fluid jacket cavity 46 and the second fluid 50 within the fluid chamber 30. As illustrated in FIG. 3, in various embodiments, the inner surface 26 of the heat exchanging wall portion 24 is axially and circumferentially aligned with the outer surface 28 of the heat exchanging wall portion 24, the stator 36 is axially aligned with the heat exchanging wall portion 24 of the housing 14, and a portion of the stator carrier 40 is axially aligned with and positioned radially outboard of the stator 36. Further details of the electric drive unit 10 are set forth in commonly-assigned U.S. patent application Ser. No. 18/177,236, filed on May 2, 2023, which is hereby incorporated herein by reference in its entirety.

A drive unit, such as drive unit 10, includes one or more sealing elements for preventing oil from entering/exiting certain regions. For example, one or more shaft seals may be provided for sealing the rotor shaft 42 to the housing or other components (e.g., end cover, etc.). These dynamic seals can leak if they remain submerged when the drive unit 10 is not operating causing severe failure of the drive unit.

Aspects of the present disclosure provide a bleed connection between the oil cooling circuit and the gearbox sump when the unit is out of operation such that oil can drain back to the gearbox sump when the unit is not operating thereby ensuring the dynamic seals do not remain submerged. The bleed connection between the oil cooling circuit and the gearbox is effectively blocked when the unit is operating thereby ensuring full pressure/flow during operation.

Turning to FIGS. 7-12, an exemplary drive unit 110 in accordance with the present disclosure is illustrated. The drive unit 110 includes many of the same features as drive unit 10, including a heat exchanger 112. The electric drive unit 110 has a housing 114. The housing 114 can be functionally divided into a motor or center housing portion 116 and a gear or gearbox housing portion 118. In some embodiments, the housing 114 may be designed as a die-cast aluminum housing and may be formed in multiple parts. A gearbox 120 supported in the gearbox housing portion 118 may include a planetary gearset, a differential, etc. The gearbox housing portion further includes sump 122.

The center housing portion 116 includes an electric motor 134 having a stator 136, a rotor 138, a stator carrier 140, and a rotor shaft 142. The rotor shaft 142 is sealed to the housing 114 with one or more dynamic seals 143.

The stator 136 is positioned radially outboard of the rotor 138. The housing 114 houses the electric motor 134. A fluid jacket 144 is formed and bounded by the stator carrier 140 and a portion of the housing 114. The center housing portion 116 includes a sump 146.

An oil circuit 150 in accordance with the present disclosure circulates oil from the gearbox portion 118 through the heat exchanger 112 past the rotor shaft 142 and back to the gearbox portion 118. It will be appreciated that the rotating components of the gearbox 120 create a dynamic pressure when rotating that generates flow through the oil circuit 150. In general, the oil exits the gearbox portion 118 into the center housing portion 116 where it is directed to the heat exchanger 112. Upon exiting the heat exchanger 112, the oil is circulated about the rotor shaft 142 and/or other components before returning to the gearbox region 118. A bleed passage 160 connects the oil circuit 150 and/or sump 146 to the sump 122 of the gearbox housing portion 118. In one embodiment, the bleed passage 160 includes an orifice 162 formed in a sealing gasket 164 between the center housing portion 116 and the gearbox housing portion 118 (see FIG. 12). The orifice 162 can have a diameter of, for example, 2 mm.

Figures 8, 9:
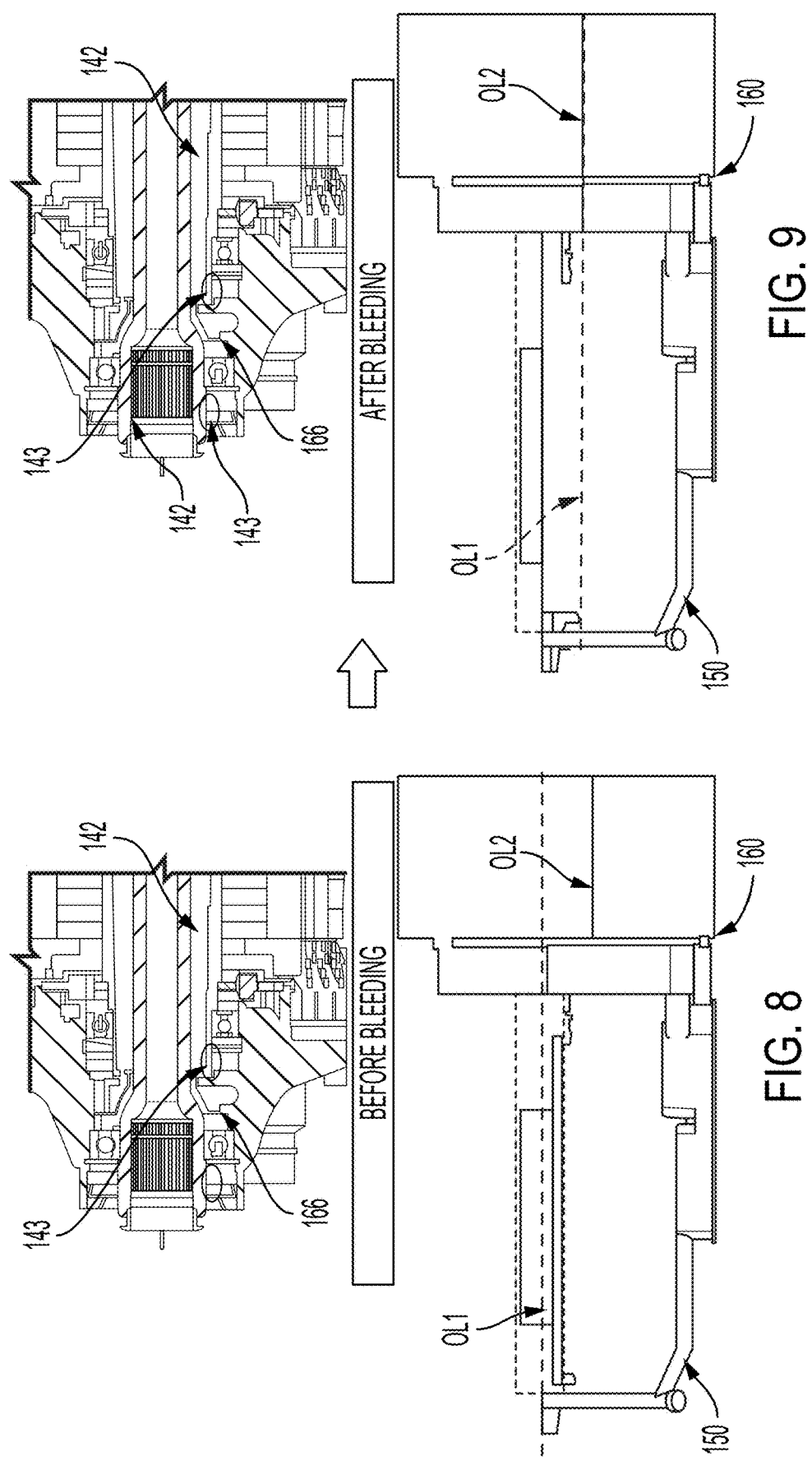
FIG. 8 is a combined enlarged portion of FIG. 7 and schematic diagram showing oil levels in the drive unit before bleeding.
FIG. 9 is a combined enlarged portion of FIG. 7 and schematic diagram showing oil levels in the drive unit after bleeding.

With additional reference to FIGS. 8 and 9, during operation of the gear box 120 the oil level OL1 in the center housing portion 116 may be at or above at least a portion of the dynamic seals 143. FIG. 8 shows the oil level oil level in the housing 114 prior to bleeding such as, for example, immediately after the gearbox 120 stops operating. The oil level OL1 in center housing portion 116 is higher than the oil level OL2 in the gearbox portion 118.

The static pressure of the oil in the center housing portion 116 causes the oil level OL1 in the center housing portion 116 to drop as oil flows through the bleed passage 160 to the gearbox housing portion 118. Eventually, the oil level OL1 in the center housing portion 116 and oil level OL2 in the gearbox housing portion 118 equalize at a level below the dynamic seals 143. Additional bleed holes, such as bleed hole 166, are provided to ensure the dynamic seals 143 do not remain submerged after operation.

When the gearbox 120 is in operation, however, flow through the bleed passage 160 from the center housing portion 116 to the gearbox housing portion 118 is prevented due to the dynamic pressure in the gearbox housing portion 118 at the bleed passage 160 being greater than the pressure in the center housing portion 116. This ensures full flow of oil through the oil circuit 150 during operation.

Figure 11:
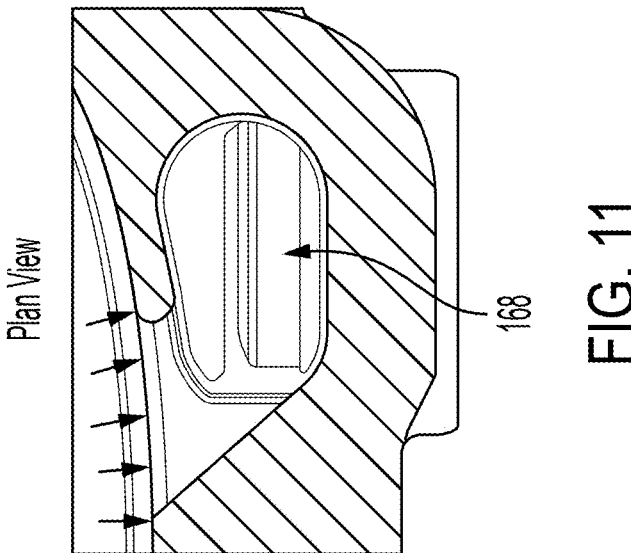
FIG. 11 is a plan view of the sump and well of the drive unit of FIG. 7.
Figure 10:
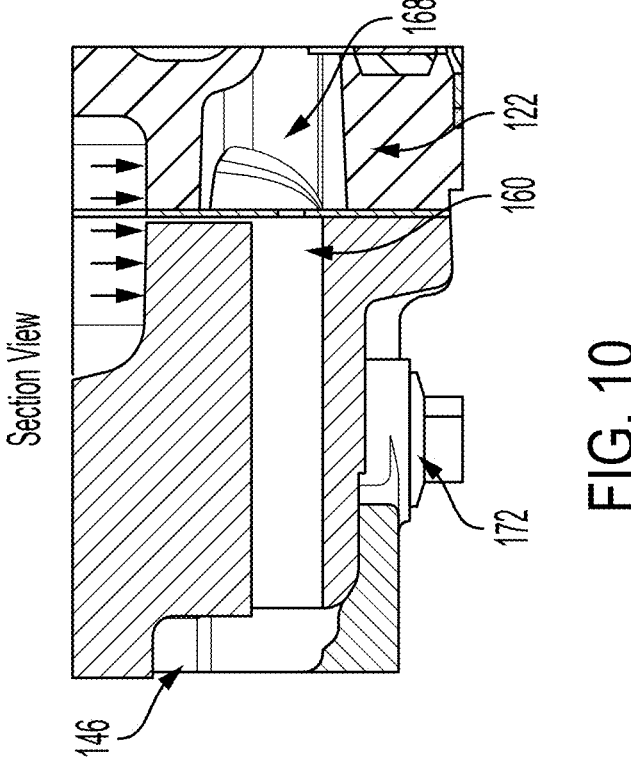
FIG. 10 is a cross-sectional view taken through a sump of the drive unit of FIG. 7.

With reference to FIGS. 10 and 11, the bleed passage 160 is connected to a well 168 of the sump 122 near an outer periphery of the gearbox housing portion 118. In one embodiment, the well 168 is located directly radially outwardly of and axially-aligned with the planet gears of the gearbox 120 (or other rotating components of the gearbox 120) to maximize dynamic pressure at the bleed passage 160 in the gearbox housing portion 118 during operation. In some embodiments, the dynamic pressure at the bleed passage 160 in the gearbox housing portion 118 during higher rpm speeds can exceed the pressure in the center housing portion 116 such that additional flow is provided to the oil circuit 150 resulting in increased heat transfer and lubrication during periods of peak performance as compared to a conventional drive unit without the bleed passage 160.

Figure 12:
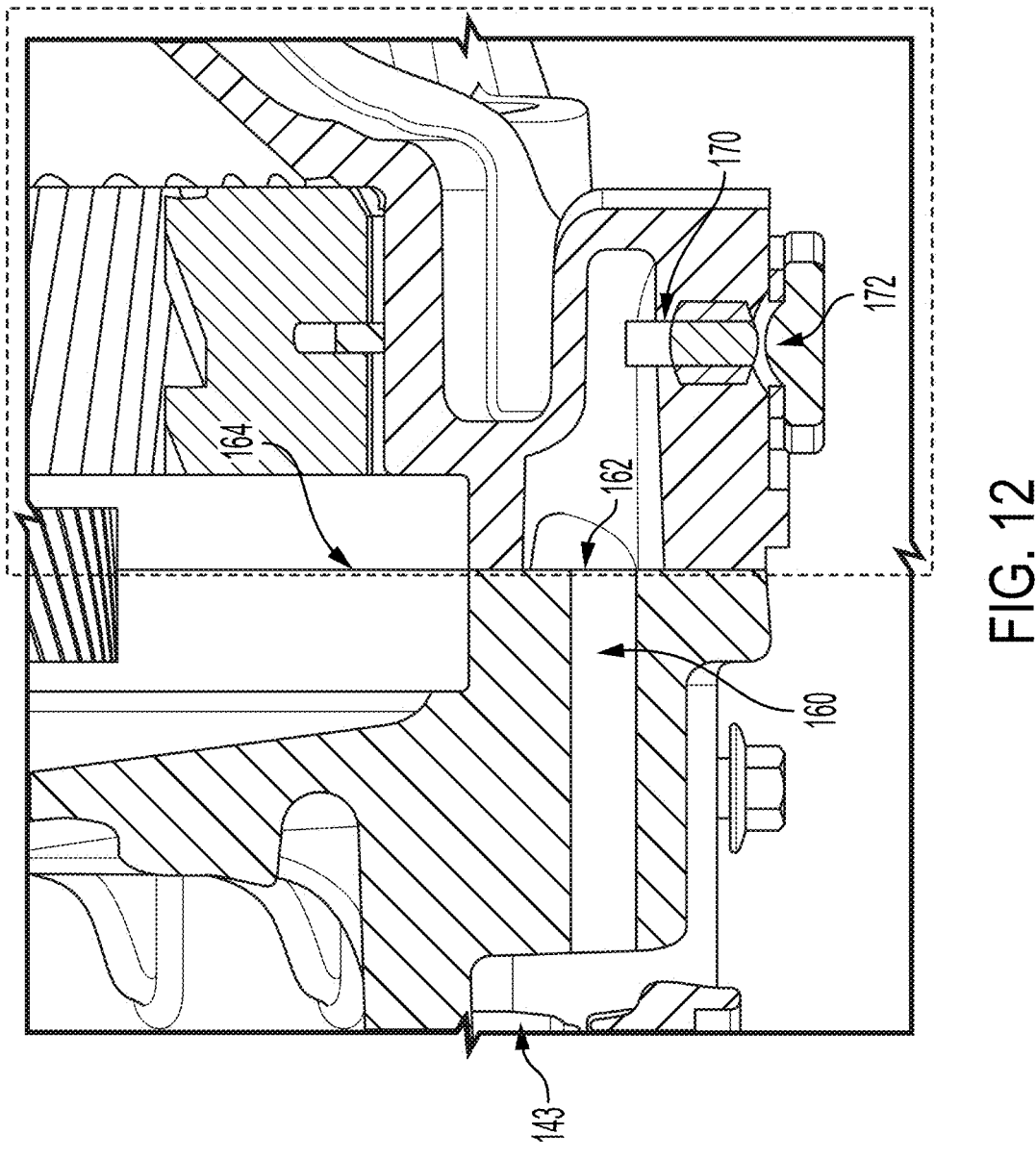
FIG. 12 is a cross-sectional view of a bleed passage between a sump of a center housing portion and the sump of a gearbox housing portion of the drive unit of FIG. 7.

With additional reference to FIG. 12, a further advantage of the drive unit 110 of the present disclosure is the simplification of draining oil from the unit. In this regards, a drain port 170 is provided in a bottom of the well 168. A removable drain plug 172 can be removed to drain the oil from the unit 110. The drain port 170 is in fluid communication with the sump 122 of the gearbox housing portion 118 as well as the sump 146 of the center housing portion 116 via the bleed passage 160. This allows oil to be drained from both sumps 122 and 146 via a single drain port 170 and obviates the need for a second drain port for draining the center housing portion 116.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 electric drive unit
12 heat exchanger
14 housing
16 center housing region
18 gearbox housing region
20 gearbox
22 sump
24 heat exchanging wall portion
26 inner surface
28 outer surface
fluid chamber
32 cover
34 electric motor
36 stator
38 rotor
40 stator carrier
42 rotor shaft
44 fluid jacket
46 fluid jacket cavity
48 first fluid
50 second fluid
54 surface
68 third protrusion
70 serpentine flow path
72 U-shaped flow path
110 drive unit
112 heat exchanger
114 housing
116 center housing portion
118 gearbox housing portion
120 gearbox
122 sump
134 electric motor
136 stator
138 rotor
140 stator carrier
142 rotor shaft
143 dynamic seal
144 fluid jacket
146 sump
150 oil circuit
160 bleed passage
162 orifice
164 scaling gasket
166 bleed hole
168 well
170 drain port
172 drain plug
OL1 oil level
OL2 oil level

What is claimed is:

1. A drive unit comprising:
a housing including a central portion and a gearbox portion separate from the central portion;
at least one of an electric motor or a heat exchanger supported in the central portion of the housing;
a gearbox having rotating components supported in a-the gearbox portion of the housing;
an oil circuit in fluid communication with the gearbox portion of the housing for circulating oil to and from at least one of the electric motor or the heat exchanger in the central portion of the housing in response to dynamic pressure generated by the rotating components of the gearbox when in operation; and
a bleed passage connecting the oil circuit in the central portion of the housing to the gearbox portion of the housing;
wherein dynamic pressure in the gearbox portion of the housing generated by the rotating components when in operation restricts flow of oil through the bleed passage from the oil circuit to the gearbox portion of the housing; and
wherein static pressure in the gearbox portion of the housing when the gearbox is not in operation permits flow of oil from the oil circuit to the gearbox portion of the housing.

2. The drive unit according to claim 1, wherein the gearbox portion of the housing includes a sump.

3. The drive unit according to claim 2, wherein the oil circuit is connected to the gearbox portion of the housing for the supply and return of oil above the sump and the bleed passage is connected to the sump.

4. The drive unit according to claim 3, wherein the central portion of the housing includes a sump.

5. The drive unit according to claim 4, wherein the bleed passage extends between the sump of the gearbox portion of the housing and the sump of the central portion of the housing.

6. The drive unit according to claim 4, further comprising at least one dynamic seal, wherein the bleed passage is below the at least one dynamic seal, whereby when the gearbox is not in operation, a fluid level in the sump of the gearbox portion of the housing and a fluid level in the sump of the central portion of the housing can equalize at a level below the at least one dynamic seal.

7. The drive unit according to claim 4, wherein the housing further comprises a drain port for draining oil from the sump of the gearbox portion of the housing, wherein the drain port is in fluid communication with the sump of the central portion of the housing via the bleed passage.

8. The drive unit according to claim 3, further comprising a gasket between the gearbox portion of the housing and the central portion of the housing, wherein the bleed passage comprises a hole in the gasket.

9. A method of controlling flow of fluid in a hydraulic circuit of a drive unit comprising:
providing a drive unit having:
a housing including a central portion and a gearbox portion separate from the central portion;
at least one of an electric motor or a heat exchanger supported in the central portion of the housing;
a gearbox having rotating components supported in a gearbox portion of the housing;
an oil circuit in fluid communication with the gearbox portion of the housing for circulating oil to and from at least one of the electric motor or the heat exchanger in the central portion of the housing in response to dynamic pressure generated by the rotating components of the gearbox when in operation; and
a bleed passage connecting the oil circuit in the central portion of the housing to the gearbox portion of the housing; and
operating the rotating components of the gearbox to generate a dynamic pressure in the gearbox portion of the housing to restrict flow of oil through the bleed passage from the oil circuit to the gearbox portion of the housing.

10. The method according to claim 9, wherein the gearbox portion of the housing includes a sump.

11. The method according to claim 10, wherein the oil circuit is connected to the gearbox portion of the housing for the supply and return of oil above the sump and the bleed passage is connected to the sump.

12. The method according to claim 9, wherein the central portion of the housing includes a sump.

13. The method according to claim 12, wherein the bleed passage extends between the sump of the gearbox portion of the housing and the sump of the central portion of the housing.

14. The method according to claim 12, further comprising at least one dynamic seal, wherein the bleed passage is below the at least one dynamic seal, whereby when the gearbox is not in operation, a fluid level in the sump of the gearbox portion of the housing and a fluid level in the sump of the central portion of the housing can equalize at a level below the at least one dynamic seal.

15. The method according to claim 12, wherein the housing further comprises a drain port for draining oil from the sump of the gearbox portion of the housing, wherein the drain port is in fluid communication with the sump of the central portion of the housing via the bleed passage.

16. The method according to claim 9, further comprising a gasket between the gearbox portion of the housing and the central portion of the housing, wherein the bleed passage comprises a hole in the gasket.

17. A drive unit comprising:

a housing;

a gearbox having rotating components supported in the gearbox portion of the housing;

an oil circuit in fluid communication with the gearbox portion of the housing for circulating oil in response to dynamic pressure generated by the rotating components of the gearbox when in operation; and a bleed passage connecting the oil circuit to the gearbox portion of the housing;

wherein dynamic pressure in the gearbox portion of the housing generated by the rotating components when in operation restricts flow of oil through the bleed passage from the oil circuit to the gearbox portion of the housing;

wherein static pressure in the gearbox portion of the housing when the gearbox is not in operation permits flow of oil from the oil circuit to the gearbox portion of the housing;

wherein the gearbox portion of the housing includes a sump;

wherein the oil circuit is connected to the gearbox portion of the housing for the supply and return of oil above the sump and the bleed passage is connected to the sump;

wherein the housing includes a central portion containing at least one of a heat exchanger or a motor, and the oil circuit circulates oil through at least one of the heat exchanger or the motor; and further comprising a gasket between the gearbox portion of the housing and the central portion of the housing, wherein the bleed passage comprises a hole in the gasket.

* * * * *